Dec. 28, 1926.

W. C. STEVENS 1,612,787

COLLAPSIBLE CORE

Filed Sept. 23, 1924  3 Sheets-Sheet 1

INVENTOR.
WILLIAM C. STEVENS

BY
ATTORNEY.

Dec. 28, 1926.
W. C. STEVENS
1,612,787
COLLAPSIBLE CORE
Filed Sept. 23, 1924   3 Sheets-Sheet 3
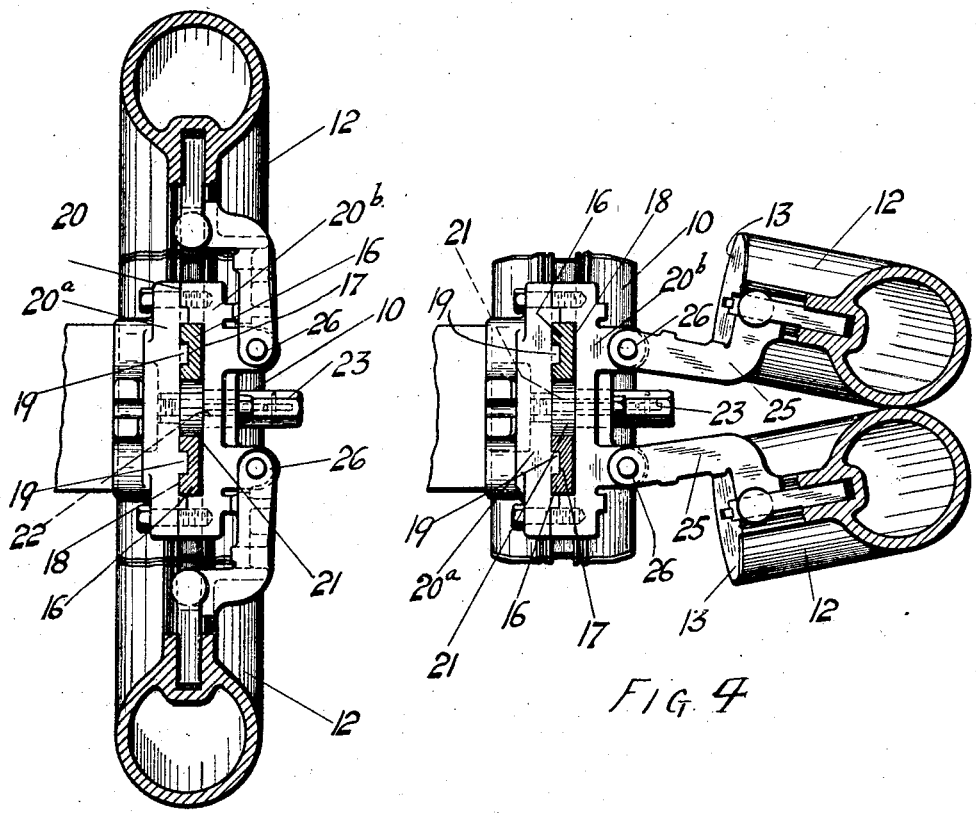
FIG. 3  FIG. 4
INVENTOR.
WILLIAM C. STEVENS
BY 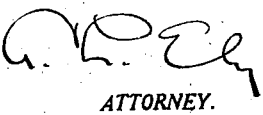
ATTORNEY.

Patented Dec. 28, 1926.

1,612,787

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

COLLAPSIBLE CORE.

Application filed September 23, 1924. Serial No. 739,319.

The chief object of the invention is to provide an improved collapsible core construction in which a plurality of core sections are permanently connected together on a tire building machine and are adapted to be readily collapsed so that a completed tire casing may be removed and particularly the invention is directed toward the improvement of collapsible core structure whereby they will permit the ready removal of tires of large section, such as, balloon tires, therefrom.

The above and other objects will become more readily apparent as the following description is read in connection with the accompanying drawings, it being understood that the invention is not limited by the specific form thereof shown and described.

Of the accompanying drawings,

Figure 3 is a vertical diametral section partly in elevation of the core as shown in Figure 2; and Figure 4 is a similar view showing the core in completely collapsed condition.

Figure 1:
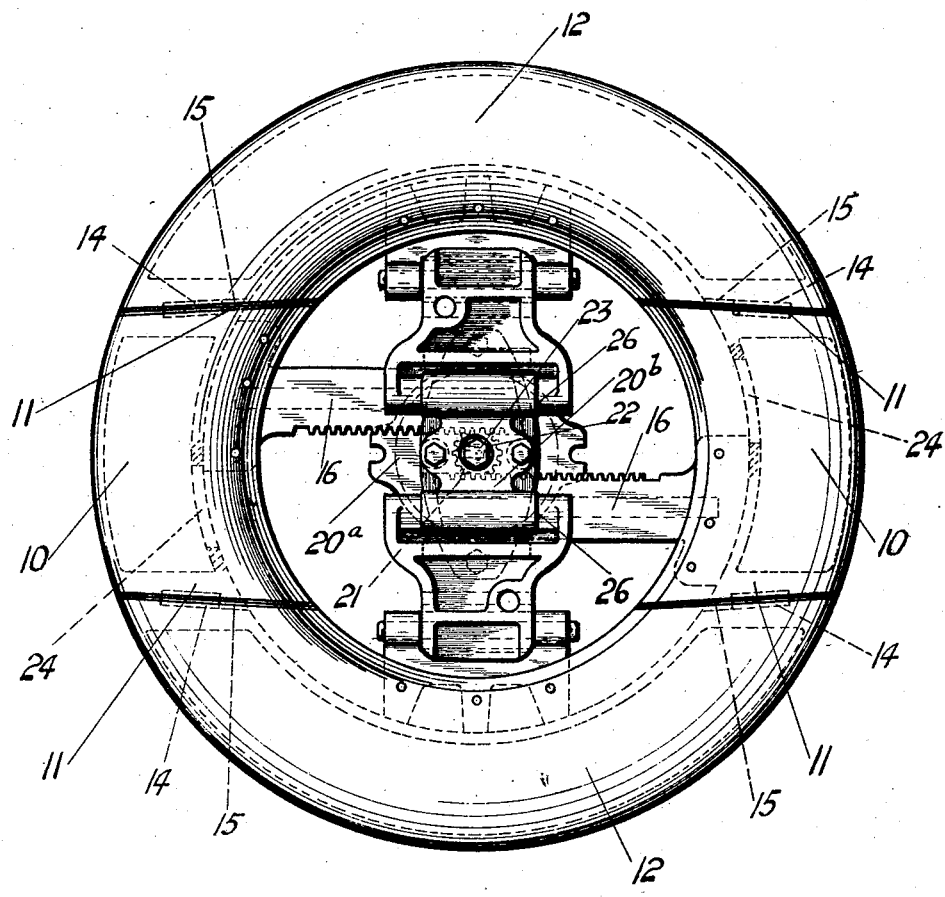
Figure 1 is a front elevation of a core constructed according to the invention and shown in non-collapsed condition.

Referring to the drawings, the core comprises opposite key sections 10, 10 formed with ends 11, 11 which converge outwardly of the core to permit drawing of the sections inwardly from the core circle. Between the key sections 10 are opposite hinged sections 12, 12. The sections 12 are provided with ends 13, 13 adapted to mate with the ends 11, the latter being provided with keys 14 adapted to travel in keyways 15 formed in the ends 13.

Figure 2:
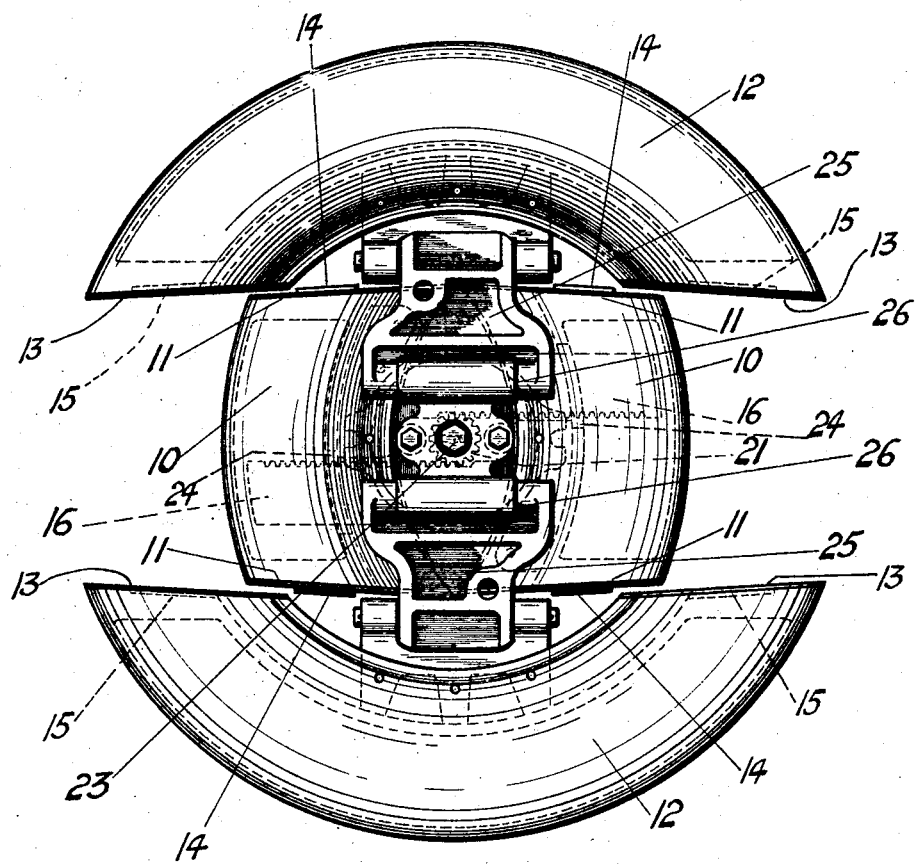
Figure 2 is a front elevation of the core shown in Figure 1 showing the same in partly collapsed condition.

The sections 10 are mounted on rack bars 16, 16 provided with grooves 17 by which they are arranged to slide in a slot 18 on ribs 19, 19 formed on a chuck 20, the latter being preferably formed in two parts 20ª and 20ᵇ, the former being secured on a drive shaft, (not shown) and the latter being bolted to the former to provide the slot 18, a gear 21 is rotatably mounted on the chuck 20 so as to rotate in slot 18 and to mesh with racks 16, 16 a suitable device for rotating said gear being provided by securing the same on a shaft 22 having a non-circular head 23 adapted to enter a corresponding socket in a suitable crank handle (not shown). All of the core sections are formed hollow so as to reduce expense and weight and core sections 10 are provided with apertures indicated at 24, 24 in line with the respective rack bars 16 whereby the latter may extend into the interior of the opposite sections 10 when the latter are drawn together as illustrated in Figure 2. Thus core sections 10 may be drawn inwardly into abutting relation to the bracket 20.

Core sections 12 are hinged onto links 25, 25 which are formed with portions so offset from the plane of the core that the links may in turn be hinged onto the outer portion of chuck section 20ᵇ as shown at 26, 26. Sections 12 are thus adapted to be swung out of the plane of the core into abutment with each other, as illustrated in Fig. 4 and if desired, to be further swung on the links 25 until the sections lie in abutting relation in parallel planes.

In operation, the core being in the condition shown in Figure 1, plies of fabric, beads etc. are applied thereto in the usual manner to form the carcass of a tire. When the tire is complete and ready for removal, a crank is applied to head 23 and rotated. This rotates gear 21 which operates racks 16 in opposite direction and draws sections 10 inwardly until they are stopped by the chuck 20, the racks 16 in the meantime enter the apertures 24 and when the sections 10 are completely withdrawn, the racks extend into the sections 10 as illustrated in Figure 2. Sections 12 are then swung on links 25 which permit the sections to swing while remaining in a plane parallel to the core so that the carcass supported thereon is drawn over the sections 20 and can then be drawn from the sections 12. The sections 12 are then swung back into the position shown in Figure 2 and the gear 21 is rotated in the reverse direction to cause sections 10 to again take up their positions in the core circle.

Modifications of the invention may be resorted to without departing from the spirit thereof or the scope of the appended claims.

What I claim is:

1. In a collapsible core construction, the combination of oppositely disposed key sections, bars fixedly connected to the key sections, a chuck at the axis of the core in which said bars are slidably mounted, said key sections each having an aperture therein adapted to receive the bar connected to the opposite section, and a link pivoted to the central plate and also pivoted to an intermediate core section.

2. In a collapsible core construction, the combination of key sections, bars fixedly connected to said key sections to guide same toward and from the center of the core, said key sections each having an aperture therein adapted to receive the bar connected to the opposite section and intermediate sections located between the key sections and having pivotal connections at the center of the core.

3. In a collapsible core construction, the combination of oppositely disposed key sections, bars fixedly connected to the key sections, a chuck on which the bars are slidably mounted, and means for simultaneously operating the bars in opposite direction to withdraw the sections from or return them to the core circle, each of said sections having an aperture therein in alignment with the bar connected to the other section, whereby the bars can enter the apertures to permit the sections to collapse into abutting relation with the chuck.

WILLIAM C. STEVENS.